Patented Sept. 13, 1927.

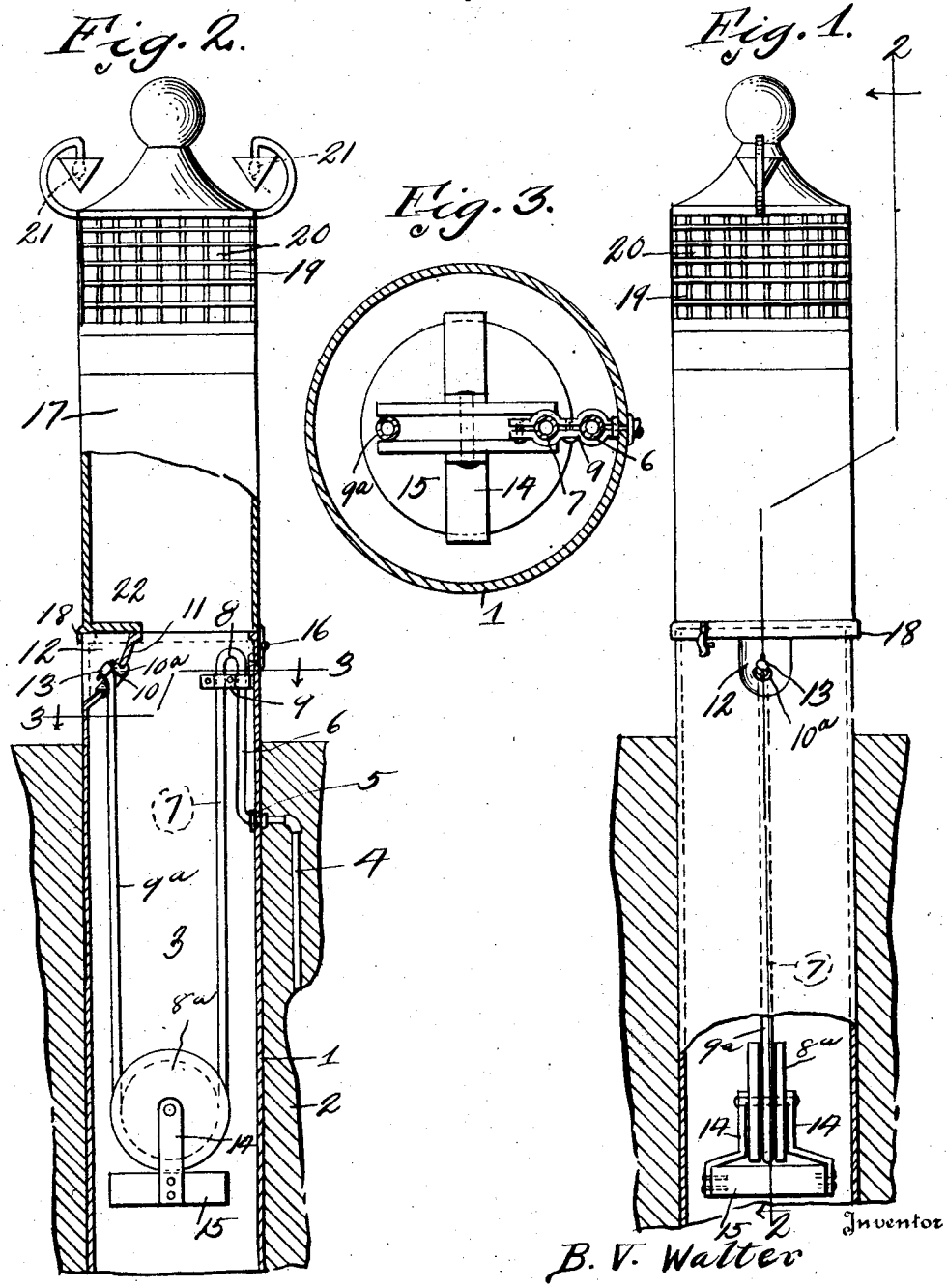

1,642,132

UNITED STATES PATENT OFFICE.

BENJAMIN V. WALTER, OF OMAHA, NEBRASKA.

AIR-HOSE HOUSING.

Application filed September 30, 1924. Serial No. 740,798.

The invention relates to housings for air dispensing hose, and has for its object to provide a device of this character which is ornamental, and provided with an air dispensing hose of the character used at service stations and constructed in a manner whereby the hose is entirely disposed within the housing when not in use, and when in use may be pulled out of the housing against the action of a pulley carried weight suspended on the hose.

A further object is to provide an air housing comprising a base preferably imbedded in the ground, and in which base the air hose is disposed. One end of the air hose is attached to the base by a kink preventing clamp, and the other end of the hose extends through the wall of the base into the recess in the side of the base where it may be easily reached for pulling the hose out of the base against the action of a pulley carried weight. The recess allows the entire housing of the end of the hose, and protects the same from the weather.

A further object is to provide the upper end of the base with a hinged cover, which is preferably ornamental and may be illuminated. Also to provide the lower end of the cover with an annular flange which overlies the side of the upper end of the base thereby preventing water or foreign matter from entering the base. The hinged cover also forms means whereby access may be readily had to the interior of the device for repair purposes.

With the above and other objects in view the invention resides in the combination and arrangement of parts as hereinafter set forth, shown in the drawing, described and claimed, it being understood that changes in the precise embodiment of the invention may be within the scope of what is claimed without departing from the spirit of the invention.

In the drawing:—

Figure 1 is a front elevation of the device, showing parts broken away to better show the structure.

Figure 2 is a vertical sectional view taken on line 2—2 of Figure 1.

Figure 3 is a horizontal sectional view taken on line 3—3 of Figure 2.

Referring to the drawing, the numeral 1 designates the cylindrical base of the device, which device is preferably imbedded in the ground 2, and is provided with a chamber 3. Disposed to one side of the base 1 is an air supply pipe 4 which may lead to any suitable source of air supply, such for instance as a pump. Pipe 4 extends through the wall of the base 1 at 5 and has connected thereto the end 6 of a flexible hose 7, which hose may be of any conventional form of air hose. The hose 7 is provided with an upwardly extending bight 8, the opposite sides of which are securely clamped in a separable clamp 9 carried by the wall of the base 1 and forms means for preventing a sharp bend or kink in the bight 8, and consequently prevents the hose from becoming broken. The hose 7 extends downwardly into the chamber 3 and around a pulley 8$^a$, and has its portion 9$^a$ extending upwardly towards the upper end of the base 1, and through an aperture 10 of a glass eye 10$^a$ in the wall 11 of the recess 12 in the side of the base 1, where it can be easily reached by the operator when it is desired to pull the hose 9 from the base for inflating a tire. The portion 9 of the hose terminates in a conventional form of air valve 13, which valve prevents the end of the hose from passing through the aperture 10. By providing the recess 12, it is obvious that no portion of the hose will hang outside the base when not in use and the valve will be protected from the weather and water will not enter the aperture 10. Suspended from the pulley 8 by means of arms 14 is a weight 15, which weight is sufficiently heavy whereby when the operator releases the free end of the hose, said hose will be drawn back into the base 1, and consequently the hose will not lie on the pavement as is now the practice and will be preserved from the weather and deterioration.

Hingedly connected at 16 to the upper end of the base 1 is a cylindrical cover 17, which cover may be of any height desired and is preferably ornamental as shown. The cover 17 at its lower end is provided with an annular flange 18 which flange engages over the upper end of the base 1 and prevents water from entering between the cover and the base. The upper end of the cover 1 is preferably provided with grille work 19 having a glass backing 20 which may be illuminated and with electric lamps 21 for illuminating purposes. Extending inwardly from the lower end of the cover 17 is a plate 22, which plate forms a cover for the upper end of the recess 12 and prevents dirt and foreign matter from entering the base 1.

From the above it will be seen that an air hose housing is provided, which housing is simple in construction the parts reduced to a minimum and one wherein the hose will be drawn into the housing when released by persons using the same.

The invention having been set forth what is claimed as new and useful is:—

1. An air hose housing device comprising a base having a chamber therein, an air hose disposed in said chamber and having a downwardly extending bight, a pulley supported weight carried by said bight, the free end of said hose extending through an aperture in an inwardly offset wall of the base and into a recess formed by said wall, and a hinged cover carried by said base and forming a cover for the upper side of the recess formed by the inwardly offset wall and also a cover for the upper end of the base.

2. An air hose housing device comprising a base having a chamber therein, an air hose disposed in said chamber and having an upwardly extending bight adjacent the upper end of the base, a clamping member carried by said base and holding said bight adjacent its upper end, said hose having a downwardly extending bight, a pulley supported weight carried by said downwardly extending bight, the free end of said hose extending upwardly and through an aperture in an inwardly offset wall in the base and into a recess formed by said wall, a hinged cover carried by the upper end of said base, said cover forming a closure for the chamber of the base and for the upper side of the recess.

In testimony whereof I hereunto affix my signature.

BENJAMIN V. WALTER.